United States Patent Office 3,453,222
Patented July 1, 1969

3,453,222
UNSATURATED SULTONE DERIVATIVES OF PROTEINS
Harland H. Young, Western Springs, Ill., assignor to Swift & Company, Chicago, Ill., a corporation of Illinois
No Drawing. Filed Feb. 28, 1966, Ser. No. 530,365
Int. Cl. C08h 1/00; C07g 7/00
U.S. Cl. 260—8                10 Claims This invention relates to methods of chemically modifying proteinaceous materials and to the resulting compositions. More specifically, the invention concerns reaction products of proteinaceous materials and internal esters of sulfonic acids and to the products produced by the polymerization of proteins which have been modified by treatment with unsaturated internal esters of sulfonic acid. The invention is based, in part, on the initial discovery that proteins may be chemically modified by reaction with alkane and alkene sultones to produce products having substantially different characteristics from the unmodified materials.

Historically, workers in the field have attempted for several years to find a commercially practicable method for coupling proteinaceous materials. Numerous chemical cross-linking agents such as aldehydes, polyamines, polycarboxylic acids, acid anhydrides, etc., have been investigated. In almost every instance in which coupling occurred, the disadvantages far outweighed the advantages. For example, attempts to chemically modify proteins ordinarily meet with difficulty in that loss of inherent desirable qualities, such as high molecular weight, tensile strength, solubility, etc., often result due to the necessary reaction conditions or components which may lead to denaturation, hydrolysis, etc. Other disadvantages include insolubility in suitable solvents, the inability to control the reaction or stop it at a desired point, and the production of heterogeneous products that do not lend themselves to formation of continuous films.

Therefore, it is an object of this invention to produce new and useful compositions utilizing proteinaceous materials.

A further object of the invention is the provision of an improved method for upgrading proteinaceous materials to provide valuable new industrial products.

Another object is to provide a means whereby water solubilizing groups can be introduced into a protein structure under very mild conditions.

An additional object is to provide modified proteinaceous material which can be subsequently polymerized.

A further object is to produce proteinaceous materials which are soluble in suitable solvents and which produce a homogeneous product which lends itself to the formation of continuous films.

Other objects and advantages will become apparent to those skilled in the art from the detailed description which follows.

Generally, the invention is concerned with the treatment of proteins and hydrolytic degradation products of proteins to form valuable products which have significantly decreased isoelectric points, increased water solubilities and are more readily alkali dispersible. In one embodiment of the invention, sulfoalkenyl groups are attached to one or more amino, hydroxy, mercapto, imino groups of the proteinaceous substance resulting in a vinyl-type molecule. The anchoring of such vinyl groups to the proteinaceous residue permits polymerization to very large molecular weight materials which retain their solubility in water or dilute alkali due to the multiplicity of sulfonic acid functions. On the other hand, depending upon the vinyl monomers and/or amounts utilized, water insoluble copolymers are possible. Homopolymers as well as copolymers with vinyl monomers result in typical resin emulsions which exhibit considerable adhesive properties. These emulsions can be dried to reasonably clear films and yield clear, viscous solutions when dissolved in dimethyl formamide, n-methyl pyrrolidone or methyl butynol. As used herein, the term "protein" or "proteinaceous substance" is intended to include the hydrolytic degradation products of proteins.

More specifically, the modified proteins of this invention are prepared by the treatment of a solvent solution or suspension of protein, under mild alkaline condition, with a sultone so as to condense the sultone with the protein molecule. Generally speaking, the reaction is carried out for at least about one hour at a temperature of about 40° C. to 50° C. and at a pH of about 8 to 10. These moderately mild reaction conditions are preferred because of a desire to maintain hydroyltic breakdown to a minimum. However, more strenuous conditions of temperature and alkalinity are practicable and sometimes even useful. For example, resistant keratin protein may be "sultonated" advantageously at temperature above 60° C. On the other hand, nongelling proteins such as casein, soy or albumens may react at 20° C. albeit more slowly. The sulfoalkenyl modified protein can be polymerized with vinyl monomers by means of the conventional vinyl-type catalyst. Generally, the temperature at which the polymerization reaction is carried out will depend upon the monomers employed and also the modified protein. Temperatures of about 20° to 150° C. are contemplated, however, a temperature in the range of 80–90° C. insures a reasonable reaction time of around ½ to 2 hours for completion of the reaction.

Protein materials with which the sultones react include all proteinaceous substance which can be placed in a dispersion or solution on the alkaline side. They include animal and vegetable proteins of both the simple and conjugated type. Nonlimiting examples are soybean, zein, cottonseed, peanut, casein of the alkaline soluble group, as well as their seed meals and hydrolysis products. A second group includes the keratins, including hoof, horn, wool, and feathers. A third group comprises casein, collagen, glue, gelatin and hydrolysis products such as stick which is the evaporated hydrolysis water obtained from wet or steam rendering. All proteinaceous materials or their derivatives that are aqueous or alcohol-aqueous soluble are preferred; however, proteins which are dispersible in other solvents are usable. Such solvents include N-methyl pyrrolidone, dimethyl sulfoxide, dimethyl formamide, and methyl butynol. The protein may be in the native, denatured or degraded state through hydrolysis, such as in the form of polypeptides.

In the preparation of protein derivatives by reaction with the sultones numerous procedures may be used other than the conventional dispersion of the sultone into a mildly alkaline aqueous solution of the protein.

(a) The protein solution may be diluted with methanol or ethanol to the point of incipient precipitation of the protein and then treated with an alcoholic solution of the sultone.

(b) The procedure of (a) can be followed using acetone in place of the alcohols.

(c) Either dimethyl formamide, dimethyl sulfoxide, or N-methyl pyrrolidone may be used as partial solvents with water for this reaction.

Irrespective of the method used, we have found that reaction is most rapid when the protein is in solution. If not, then very finely divided material, similar to spray dried gelatin or albumen is preferred.

Suitable starting materials for the process according to the present invention are the gamma sultones, i.e., 3-hydroxy-1-propane sulfonic acid sultone and 3-hydroxy-1-propene sulfonic acid sultone. Exploratory work with the 5-membered sultone ring shows extreme reactivity, particularly in the presence of alkali. While other sultones may possibly react, i.e., the delta and epsilon sultones, these sultones are far less reactive and require more drastic reaction conditions than the gamma sultones and, hence, are undesirable for reaction with the proteins which require relatively mild reaction conditions.

For purposes of this invention, 3-hydroxy-1-propane sulfonic acid sultone and 3-hydroxy-1-propene sulfonic acid sultone will be known by their common names, i.e., propane sultones and propene sultone. In accordance with a known prior art process, sultones are prepared by splitting off water from organic hydroxy sulfonic acids at reduced pressure and at elevated temperatures. Another industrial important method for the preparation of sultones from hydroxy-sulfonic acids starts with allyl alcohol. An alkali metal bisulfite, such as sodium bisulfite, is condensed with the double bond of the allyl alcohol in the presence of oxygen or peroxides to obtain an alkali metal salt of 3-hydroxy-propane-1-sulfonic acid in a mixture with sulfite and sulfate. The salt of the 3-hydroxy-propane-1-sulfonic acid is then freed from the inorganic salts. Subsequently, it is transformed with the aid of hydrochloric acid or with the aid of an ion exchanger into the free hydroxy-propane-sulfonic acid from which the propane-sultone is prepared. Similarly, propene sultone is readily prepared by addition of sodium bisulfite to propargyl alcohol to form the alkali metal salt of 3-hydroxy-propene-1-sulfonic acid which upon acidification and dehydration yields propene sultone.

The instant invention is primarily concerned with the reaction of the sultone with the protein under such conditions as to result principally in the general reaction centered around an amino function. Although the reactions have been conducted under such conditions as to encourage reaction of the sultone at one or more amino group locations, the corresponding reaction may be encouraged at other functional groups, e.g., carboxyl, hydroxy, mercapto, etc. Accordingly, the products of this invention may be defined as proteinyl sulfonic acids or sulfonic acid salts having either a saturated or unsaturated hydrocarbon chain contiguous to the proteinyl group and the sulfo group. A proteinyl group is that radical resulting from the condensation of a protein molecule with a sultone irrespective of whether the condensation takes place at the amino, carboxyl, hydroxy or mercapto sites along the protein chain. For example, when a protein is reacted with 3-hydroxy-1-propane sulfonic acid sultone the resulting product may be called proteinyl propane sulfonic acid. When 3-hydroxy-1-propene sulfonic acid sultone is utilized, the product is proteinyl propene sulfonic acid.

The amount of "sultonation," for example, that can be effected with any protein material is a function of the number of amine functions present which are characterized by an active hydrogen. In proteins and their degradation products, one mol of the sultone may react with each free amino, carboxyl, mercapto or hydroxyl group. In the case of glue, for example, or even gelatin, there are about 45 milliequivalents of $NH_2$ groups per 100 grams of protein as determined by a Van Slyke determination. In addition there are about 75 milliequivalents of carboxyl group per 100 grams. Hence, about 120–150 milliequivalents of propane sultone, or $$150 \times \frac{122}{1000} = 18 \text{ grams}$$

of the sultone could react with 100 grams of glue or gelatin.

Accordingly, on a weight basis, up to about 20% sultone is usually sufficient for reaction with most protein materials. In most cases, the amino group is the first point of reaction and hence the modified protein will contain (chemically combined) about 1 to 6 percent, by weight, of the sulfoalkyl or sulfoalkenyl group. This corresponds to a sultone modified protein product containing about 94 to 99 percent protein in the final product prior to any polymerization.

If the sultone is condensed with hydrolyzed proteins or polypeptides, the preferred mol ratio of sultone to proteinaceous residue would be substantially greater. However, compositions wherein an excess of either reactant is employed are useful. For example, with glue or gelatin or even soya and casein proteins, the percent sultone basis protein can range from 5 to 30% or even more when completeness of conversion is desired. Although the amino is the preferred group to be reacted other sites can be attached when reaction conditions are rendered more severe.

In one embodiment of the invention, the modified proteins are prepared by treatment, preferably in a mild alkaline solution of pH about 8 to 10, with the propene sultone as follows:

Protein + propene sultone → Pro—$CH_2$—CH=CH—$SO_3$X where Pro is the protein radical resulting from the condensation of the sultone with the protein and X is a cation. Usually X will be an alkali metal or alkaline earth metal ion or hydrogen ion.

As can be seen from the above, the modified protein now contains an unsaturated vinyl group which renders the product polymerizable or at least in a condition so that grafting is possible. Whether all available amino groups or only a few in the protein are reacted is immaterial for it has been found that the products polymerize in aqueous solutions when heated in the presence of peroxides and copolymerized with the vinyl monomers.

The modified proteins containing unsaturation undergo two types of polymerization reactions which are not possible with the parent unmodified protein. These are:

(a) Homopolymerization of the unsaturated modified protein itself using a peroxide or free radical catalyst whereby there is an increase in molecular weight and viscosity; and (b) Copolymerization with well-known vinyl monomers using the peroxide or free radical type catalyst.

Modified copolymers can be produced in which one component is the modified protein carrying chemically bonded polymerizable groups, and the other component being selected from the many well-known vinyl monomers commercially available. Furthermore, the preparations of polymerizable derivatives of two very different proteins, e.g., glue and casein, and then copolymerizing them is possible. One should also note that a mixture of vinyl monomers can be used with the modified proteinaceous material to change the product when certain properties are desired.

The polymers produced by this invention can be used as water-soluble glue products which leave insoluble films after drying. They can be used in resin-protein wood adhesives having improved moisture resistance and reduced creep or cold flow. The products can also be used as flocculating agents. Of particular interest are the modified proteins so modified with propane or propene sultone with or without subsequent polymerization which can be solubilized as ammonium salts but which become quite insoluble when dried.

The synthetic polymers are prepared by polymerizing the naturally occurring modified protein with specific quantities of at least one vinyl monomeric material to form what is believed to be graft polymers wherein the monomers are grafted onto the sulfoalkenyl protein of the protein chain. The graft polymers of this invention are prepared by the treatment under polymerization conditions of propene sultone modified protein composition with about 10% to 200% by weight of the protein material of a vinyl monomer. The resulting polymers are generally water insoluble but are soluble in alkaline solutions and exhibit solubility in certain organic solvents. In some instances, mixtures of hydrophobic and hydrophilic monomers may be combined with the modified proteinaceous material. Both the hydrophobic and hydrophilic monomers are characterized as possessing a vinyl grouping and it is important, because of the difference of water solubility of these monomers, that the desired ratio of hydrophobic to hydrophilic monomer be observed in preparing certain polymers.

The hydrophobic monomer may be selected from the alkyl acrylates, alkyl alkacrylates, acrylonitrile, styrene, vinyl esters of lower fatty acids of 2 to 6 carbons, vinyl halides, vinylidene halides, and 1,3-aliphatic dienes. The alkyl groups in the acrylates and alkacrylates have 1 to 5 carbons. Specific hydrophobic monomers coming within the scope of this term include the aliphatic 1,3-diolefins such as 1,3-butadiene, isoprene, chloroprene, and 2,3-dimethyl-1,3-butadiene. Specific alkyl acrylates are: methyl acrylate, ethyl acrylate, propyl acrylate, and butyl acrylate. Specific alkacrylates coming within the scope of the hydrophobic monomers are ethyl methacrylate and methyl metacrylate, etc. In addition, vinyl acetate, vinyl propionate, vinyl butyrate, and the vinyl halides such as vinyl chloride and vinylidene chloride, provide satisfactory hydrophobic monomers.

The hydrophilic monomers which can be present in an amount of about 10% to 100% by weight of the total sultone modified protein, include vinylic monomers such as acrylic acid, alkacrylic acid, acrylamides, alkacrylamides, N-substituted acrylamides and alkacrylamides, and vinyl pyridines. Specific substituted nitrogen heterocyclics include 4-vinyl pyridine, 2-vinyl pyridine, and 3-methyl-4-vinyl pyridine. In general, the hydrophilic monomers derived from acrylic acid can be characterized as

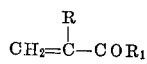

where R is an alkyl radical having 1 to 5 carbons and $R_1$ is selected from the group consisting of hydroxyl, amino, and lower aliphatic primary and secondary amino radicals.

Polymerization of the monomers with the protein can be carried out by solution polymerization in an aqueous system wtih or without the aid of a surface-active dispersing agent. Polymerization catalysts facilitate the polymerization reaction. Such well-known polymerization catalysts as the peroxide, persulfates, percarbonates, and perborates, are very satisfactory for initiating the polymerization reaction. Such specific catalysts as tertiary butyl hydroperoxide, acetyl peroxide, benzoyl peroxide, hydrogen peroxide, sodium or potassium perborate, sodium, potassium or ammonium persulfate, and water-soluble salts of percarbonic acids are contemplated. Redox type catalysts such as ferrous sulfate and ammonium persulfate can be employed if it is desired to carry out the polymerization at a lower temperature. Generally, the temperature at which the polymerization reaction is carried out will depend upon the monomers employed and also the protein on which the monomers are to be grafted. Also, the kind and concentration of catalysts, as well as limitations with respect to equipment, will affect the temperature at which the polymerization proceeds. Heating the polymerization mixture to a temperature in the range of about 80 to 90° C. insures a reasonable reaction time of about ½ to 2 hours for completion of the reaction. However, temperatures of about 20° to 100° C. are satisfactory in certain instances.

If a dispersing agent is desired in the polymerization reaction, the alkali metal salts of higher fatty acids such as sodium stearate, potassium palmitate, sodium myristate, or the corresponding ammonium salts can be employed. Additionally, the higher fatty alcohol sulfates such as sodium or potassium lauryl sulfate, as well as the higher fatty alkyl aryl sulfonates, and the high molecular weight quaternary ammonium salts having a higher fatty acid radical can be used. Another group of desirable surface-active agents are the non-ionic ethylene oxide condensation products such as the nonyl phenol-ethylene oxide condensates. It is also possible to employ in the polymerization reaction any of the well-known stabilizers such as carboxy methyl cellulose, hydroxy ethyl starch, etc.

The following examples which illustrate specific embodiments of the invention are set forth herein as illustrations only and are not to be interpreted as imposing any limitation whatsoever on the invention.

EXAMPLE I

A 175 gram quantity of moist (about 67% moisture) bovine hide material which had been lime-dehaired shredded by milling at 0.040 and 0.003 inch of plate clearance, and freed of non-collageneous matter, was partially dehydrated by washing with ethanol. This material was transferred to a two-liter resin kettle which was equipped with a stirrer, thermometer, and reflux condenser. One liter of alcohol was added, and after adjustment of the mixture pH to about 10 with concentrated, alcoholic sodium hydroxide, a solution of 20 grams of propane sultone and 200 grams of alcohol was added. The mixture was heated and maintained at a temperature equal to or less than 40° C. for about four hours with alcoholic sodium hydroxide added as required to maintain alkalinity, then allowed to stand overnight. The product was washed with alcohol, then with water at pH adjusted to 3.0, diluted to one liter volume with distilled water, heated to 70° C., and dilute sodium hydroxide added to a mixture pH of about 9.0. Under these conditions, the product was essentially solubilized almost immediately, resulting in a clear solution which was centrifuged at 3,000 r.p.m. for 15 minutes to eliminate the residue, then dialyzed in distilled water. This protein material (isoelectric point at pH about 3.5) was only difficulty filterable and could be precipitated with aluminum ion. Amino acid analysis of the hydrolyzed product indicated that the reaction with propane sultone was restricted primarily to those basic amino acids present, i.e., to histidine, hydroxylysine, lysine, and arginine, with more than 90 percent of total available histidine, hydroxylsine, and lysine, approximately 65 percent of arginine reacted.

EXAMPLE II 110 grams of gelatin (isoelectric point of approximately pH 8.0) was dissolved in 1,250 grams of distilled water by stirring at 50 to 60° C. A defoamer was added. After cooling and neglecting degradation, the pH was adjusted to about 11.0 and a solution of 34 grams of propane sultone in 300 grams of ethanol was added. The system was heated and maintained at a temperature not exceeding 40° C., and the desired alkalinity was maintained by periodic additions of sodium hydroxide. Aliquot parts were withdrawn at various time intervals for immediate acidification and determination of the resulting isoelectric points. The presence of unreacted sultone in the non-dialyzed aliquots precluded exact precision, but a rough curve was drawn to estimate resulting isoelectric points versus time. It was concluded that the reaction was nearly complete after three hours' time.

EXAMPLE III

The prior experiment was repeated, differing only in the amount of propane sultone added. In this experiment, 10.0 grams (0.082 equivalent) of propane sultone was reacted with approximately 0.09 equivalents of basic amino acids available in a quantity of gelatin. Aliquot parts of the reaction composition were withdrawn at various time intervals and a determination of resulting isoelectric points was made. It was determined that the reaction was essentially complete in 90 minutes.

EXAMPLE IV 150 grams of dry basis alkali-cured collagen was comminuted with 1,500 grams of distilled water, adjusted to a pH of about 10.0–11.0. A solution of 5.0 grams of propane sultone in 50 grams of ethanol was then added to the semifluid gel. The reaction system was maintained in an agitated state for two hours at a pH equal to or greater than about 10 without external heating. The system was then heated to about 50° C. whereby extraction of a modified gelatin material rapidly occurred.

EXAMPLE V 150 grams (approximately 135 grams anhydrous; 0.080 equivalent of basic amino acids per 100 grams) of casein was dissolved and/or dispersed in 900 grams of distilled water with pH adjustment to 10.0. A solution of 25 grams of propane sultone in 175 grams of anhydrous ethanol was added, and the system heated and maintained at a temperature of about 40° C. After 2 hours, heating and stirring was discontinued and the solution allowed to stand overnight at room temperature. An attempt to precipitate the product by pH adjustment resulted only in the formation of a gel; therefore, the system was diluted with approximately two volumes of ethanol and the precipitate was vacuum filtered. After several washings with alcohol, the modified casein was dried. Initial investigations showed use of the modified protein as a rewettable adhesive, i.e., such as is found on envelopes and stamps.

EXAMPLE VI 100 grams of soya flour (approximately 54% protein, 32% cellulosic material plus carbohydrate) was dispersed in 900 grams of water and the pH adjusted to 10. A solution of 15 grams of propane sultone and 100 grams of ethanol was added, and the system heated to 40° C., with stirring for three hours at relatively constant alkalinity. After this time, the mixture was centrifuged for about 10 minutes and the decantate was adjusted to a pH 3 and diluted with two volumes of alcohol to precipitate the protein. The mixture was vacuum filtered over coarse paper, and the precipitate was washed with ethanol. The product was readily solubilized in water near neutral pH, and this aqueous solution indicated no evidence of precipitation on acidification until a pH of about 3.8 was reached.

EXAMPLE VII 100 grams of bone glue testing 150 grams Bloom was dissolved in about 300 grams of water, and, while being held fluid at 100° F., was treated with 2 grams of sodium hydroxide dissolved in 20 grams of water. 10 grams of propene sultone dissolved in dimethyl sulfoxide was slowly added during vigorous agitation and allowed to react for one hour at a temperature of about 120° to 130° F. The reaction mixture at the end of this time was substantially neutral.

EXAMPLE VIII 100 grams of milk casein was swollen in 400 grams of water and put into solution with sufficient 6 N caustic to render the solution slightly alkaline. 12 grams of propene sultone dissolved in dimethyl formamide was added with stirring. The solution was stirred while warming to 120° F. and then allowed to cool. Finally, the mixture stood overnight at room temperature during which time the reaction was complete. The final solution was substantially neutral.

EXAMPLE IX 100 grams of zein was dissolved in 400 grams of 80% methanol and 20% water. 3 grams sodium hydroxide was dissolved in 40 cc. of water and added to the system. Finally, 12 grams of propene sultone dissolved in methanol was stirred in thoroughly. After warming to 120° F., the reaction mixture was maintained at this temperature for three hours and allowed to stand overnight. The reaction product was neutral and water soluble.

The following examples demonstrate various types of polymerization which may be effected readily.

EXAMPLE X 200 grams of gelatin (testing 250 grams jelly strength) was swollen in 500 grams cold water. After melting down on a steam bath to yield a smooth solution, 16 cc. of 6 normal sodium hydroxide was added and the system agitated. This was followed by the addition of 20 grams of propene sultone. After a reaction time of about one hour and a temperature of about 75° C., there was added 0.3 gram potassium persulfate and 7.5 cc. of 27% hydrogen peroxide to the heavy viscous solution. The mixture was whipped hot to form a polymerized foam which when dried in the air and heated became insoluble but very moisture absorbent.

EXAMPLE XI

The procedure set forth in Example X was repeated, and, prior to the addition of the peroxide catalyst there was added an additional 500 grams of water. Then while stirring under a condenser at a temperature of about 90–95° C., there was added 10 cc. of 27% hydrogen peroxide and simultaneously streams of styrene, acrylonitrile and vinyl acetate until exothermic polymerization ceased. Excess monomers in emulsion form were then treated with additional peroxide until refluxing stopped. Distillation then removed the small excess of monomers leaving an emulsion of complex grafted copolymers. The product when dried was somewhat sensitive to moisture but would not dissolve in water. The product was soluble in dimethyl formamide from which clear films could be cast.

EXAMPLE XII

The product obtained in Example VII was again prepared in large quantity and divided into five equal portions, each containing about 100 grams of bone glue (150 grams Bloom) and reacted with alkali and propene sultone as described in Example VII. Each lot was then copolymerized at a temperature of between about 70° C. and 100° C. with the following monomers using 10 grams of each monomer employed and from .05 to 0.1 gram potassium persulfate as catalyst.

Example A.—Acrylamide and methyl methacrylate
Example B.—Acrylamide and acrylonitrile
Example C.—Acrylamide and styrene
Example D.—Styrene, vinyl acetate and acrylonitrile.

Each of the reaction products was a typical resin emulsion which exhibited considerable adhesive properties. These emulsions dried to reasonably clear films and yielded clear, viscous solutions when dissolved in dimethyl formamide. Moisture sensitivity of the parent protein was thereby decreased commensurate with the amount of copolymerization effected. It is further reduced by normal tanning agents conventionally used with proteinaceous material. Due to the free sulfonic acid groups introduced by the reaction with propene sultone, the compounded resins were effectively solubilized by dilute alkalies.

EXAMPLE XIII 10 grams of collagen prepared from defatted and dried bovine corium was comminuted and suspended in 10 grams of N-methyl pyrrolidone and 10 grams of water. Some hydration and swelling was apparent. 2 grams of propane sultone was added and the collagen slowly dissolved as dilute alkali was added to maintain a pH of 9. No heat was applied and after one hour at room temperature a viscous solution was obtained which was quite clear and free from insoluble matter. It was soluble in dilute alkalies and acids.

EXAMPLE XIV 500 grams gelatin from acid cured porkskins was dissolved in 4,500 grams water and made alkaline with ammonium hydroxide to a pH of 8.0. The solution was poured on to shallow trays and, after chilling to a stiff gel, was cut in ribbons about ⅛″ x ¼″ in cross section. The product was dialyzed in running water (38° F.) for 72 hours, and dried at room temperature in a stream of cool air. This gelatin was found to have a moisture content of 9.8%, a sulfur content of 0.08 and jelly and viscosity tests of 313 grams and 43 millipoises, respectively.

100 grams of this dried "control" gelatin was mixed with 100 grams of N-methyl pyrrolidone and finally 200 grams of cold water to allow for swelling. After one hour the granular gel was melted in a water bath to a clear solution at 120° F. At this point 30 grams propane sultone was added with stirring at a temperature of 110° F. One gram of caustic soda in 25 cc. water was added slowly over a period of two minutes with constant slow agitation. Test papers indicated a pH of 9.0-9.5 after addition of the alkali, but this fell to 7.0-7.5 in about 10-15 minutes. As the reaction proceeded with no further warning there was an apparent drop in viscosity. After 24 hours at room temperature the pH had fallen to about 2.0-3.0 and the mixture did not gel at room temperature. The "sultonated" gelatin was poured onto a tray and placed in a cooler (32° F.) to gel. After cutting into fine ribbons, the product was dialyzed for 72 hours in running water at 38° F. It was finally dried in cool air at room temperature. This product was found to contain 1.02% sulfur indicating that the gelatin had combined with 3.82% of the sultone basis its own weight. This was further indicated by the pH of the dialyzed product, namely 5.4, as compared with 7.6 for the control. The jelly and viscosity had been markedly reduced to 130 grams and 17 millipoises, respectively, even though there had been no hydrolytic condition present throughout the reaction time.

Obviously many modifications and variations of the invention as hereinbefore set forth may be made without departing from the spirit and scope thereof, and therefore only such limitations should be imposed as are indicated in the appended claims.

I claim:
1. A method for producing a modified protein which comprises reacting an alkaline soluble or dispersible protein with an unsaturated gamma sultone under mild alkaline conditions.
2. The product produced by the method of claim 1.
3. The method of claim 1 wherein the protein is selected from the group consisting of glue, gelatin, collagen, caseine, soya flour, zein, and keratin.
4. The product produced by the method of claim 3.
5. The method of claim 1 wherein the sultone is 3-hydroxy-1-propene sulfonic acid sultone.
6. The product produced by the method of claim 5.
7. The method of claim 1 wherein the protein is selected from the group consisting of glue, gelatin, collagen, caseine, soya flour, zein, and keratin, the sultone is 3-hydroxy-1-propene sulfonic acid sultone, and the reaction is carried out at a pH of between about 8 and about 10 and at a temperature of between about 40° C. and about 50° C.
8. The method of claim 1 wherein the sultone is unsaturated and the modified protein is homopolymerized by means of heating in the presence of a peroxide or free radical catalyst.
9. The method of claim 1 wherein the sultone is unsaturated and the modified protein is polymerized with a vinyl monomer in the presence of a peroxide or free radical catalyst.
10. The method of claim 9 wherein the sultone is 3-hydroxy-1-propene sulfonic acid sultone.

References Cited

Chem. Abstracts, vol. 65, June 1966, 9996e–h, Gates et al.

HAROLD D. ANDERSON, *Primary Examiner.*

H. SCHAIN, *Assistant Examiner.*

U.S. Cl. X.R.

106—125, 138, 149, 154, 155; 260—112, 117, 119, 123, 123.5, 123.7